(12) United States Patent
Kim et al.

(10) Patent No.: US 11,396,280 B2
(45) Date of Patent: Jul. 26, 2022

(54) PLATOONING CONTROLLER FOR PERFORMING BRAKING CONTROL BASED ON HITCH ANGLE, A SYSTEM INCLUDING THE SAME, AND A METHOD THEREOF

(71) Applicants: HYUNDAI MOTOR COMPANY, Seoul (KR); KIA MOTORS CORPORATION, Seoul (KR)

(72) Inventors: Dong Hyuk Kim, Hwaseong-si (KR); Sang Yeob Lee, Seongnam-si (KR); Il Hwan Kim, Hwaseong-si (KR); Hong Gi Park, Seoul (KR); Kyung Joo Bang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 265 days.

(21) Appl. No.: 16/805,003

(22) Filed: Feb. 28, 2020

(65) Prior Publication Data

US 2021/0086732 A1 Mar. 25, 2021

(30) Foreign Application Priority Data

Sep. 23, 2019 (KR) ........................ 10-2019-0116931

(51) Int. Cl.
*B60T 8/17* (2006.01)
*B60T 7/20* (2006.01)
*G05D 1/02* (2020.01)
*G08G 1/00* (2006.01)

(52) U.S. Cl.
CPC .............. *B60T 7/20* (2013.01); *G05D 1/0289* (2013.01); *G05D 1/0295* (2013.01); *B60T 2201/022* (2013.01); *B60T 2230/06* (2013.01); *G08G 1/22* (2013.01)

(58) Field of Classification Search
CPC .. B60T 7/20; B60T 2201/022; B60T 2230/06; G05D 1/0289; G05D 1/0295; G08G 1/22
See application file for complete search history.

(56) References Cited

U.S. PATENT DOCUMENTS

| | | |
|---|---|---|
| 7,904,222 B2 | 3/2011 | Lee |
| 8,073,594 B2 | 12/2011 | Lee |
| 2009/0005932 A1 | 1/2009 | Lee |
| 2010/0256852 A1* | 10/2010 | Mudalige ............... G08G 1/164 701/24 |
| 2011/0125457 A1 | 5/2011 | Lee |
| 2016/0159348 A1* | 6/2016 | Lavoie ............ B60W 30/18036 701/41 |

* cited by examiner

*Primary Examiner* — Vivek D Koppikar
*Assistant Examiner* — Jeffrey R Chalhoub
(74) *Attorney, Agent, or Firm* — Lempia Summerfield Katz LLC (57) ABSTRACT

A platooning controller, a vehicle system including the same, and a method thereof perform braking control based on a hitch angle. The platooning controller includes a processor that controls platooning of one or more vehicles, each with a trailer, and includes a storage storing information for controlling the platooning. The processor controls a host vehicle such that a hitch angle of the host vehicle with the trailer meets a predetermined reference angle, when it is necessary to perform braking control, and controls the host vehicle to perform the braking control.

17 Claims, 7 Drawing Sheets

PLATOONING CONTROLLER FOR PERFORMING BRAKING CONTROL BASED ON HITCH ANGLE, A SYSTEM INCLUDING THE SAME, AND A METHOD THEREOF

CROSS-REFERENCE TO RELATED APPLICATION

This application claims the benefit of priority to Korean Patent Application No. 10-2019-0116931, filed in the Korean Intellectual Property Office on Sep. 23, 2019, the entire contents of which are incorporated herein by reference.

TECHNICAL FIELD

The present disclosure relates to a platooning controller for performing braking control based on a hitch angle, a system including the same, and a method thereof. More particularly, the present disclosure relates to technologies of performing braking control using a hitch angle of a trailer during platooning.

BACKGROUND

Platooning is a technology in which a plurality of vehicles performs autonomous driving when they are arranged at a specified interval in a line. While the plurality of vehicles is platooning, a leading vehicle, which is a vehicle located in the frontline of a platooning line, may control one or more following vehicles that follow the leading vehicle. The leading vehicle may maintain an interval between the plurality of vehicles included in the platooning line and may exchange information about behaviors and situations of the plurality of vehicles included in the platooning line using vehicle-to-vehicle (V2V) communication. The platooning vehicles may perform inter-vehicle distance control and emergency braking control using V2V communication information received from a forward vehicle and sensor information obtained by a sensor loaded into a host vehicle.

Figure 1:
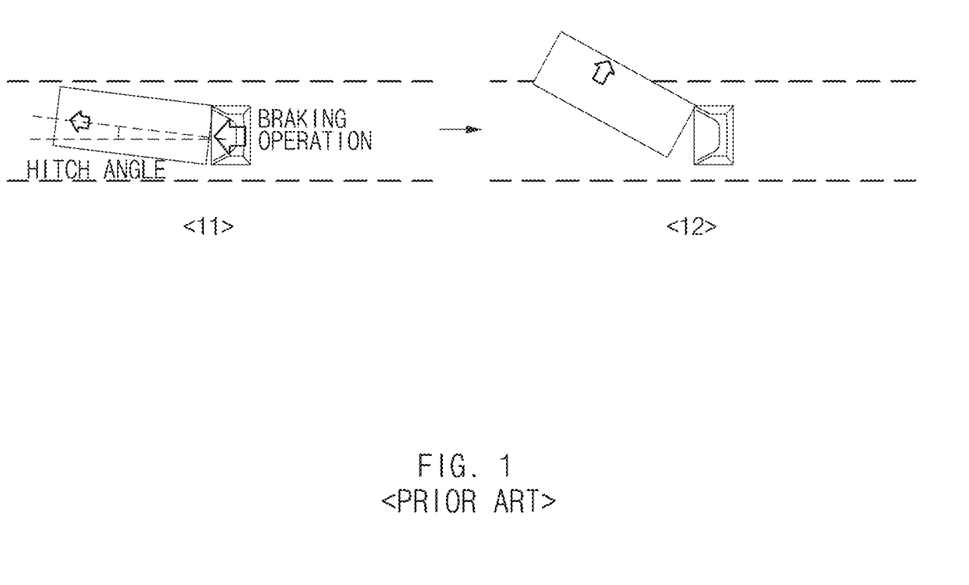
FIG. 1 is a drawing illustrating a situation where the jackknife phenomenon occurs when a platooning vehicle including a trailer brakes.

The platooning vehicles may include numerous vehicles, each with a trailer. The vehicles may be trucks. As shown by the reference numeral 11 in FIG. 1, a platooning vehicle may be pulling a trailer, i.e., a tractor trailer. Because the braking force of the trailer is weak, when a driver of the platooning vehicle brakes sharply in the state where the angles of the trailer and the tractor hauling the trailer are twisted and where a hitch angle is greater than or equal to a certain angle, a jackknife phenomenon may occur. A jackknife phenomenon occurs when the trailer and tractor towing the trailer jackknife as shown by reference numeral 12 in FIG. 1. When the jackknife phenomenon occurs, it may have a bad influence on the steering control of a following vehicle behind the leading vehicle.

SUMMARY

The present disclosure has been made to solve the above-mentioned problems occurring in the prior art while advantages achieved by the prior art are maintained intact.

An aspect of the present disclosure provides a platooning controller for performing braking control based on a hitch angle. The platooning controller reduces the hitch angle of a trailer using steering angle control and differential braking before braking during platooning to prevent the jackknife phenomenon. The present disclosure further provides a system including the same and a method thereof.

The technical problems to be solved by the present inventive concept are not limited to the aforementioned problems. Any other technical problems not mentioned herein should be clearly understood from the following description by those of ordinary skill in the art to which the present disclosure pertains.

According to an aspect of the present disclosure, a platooning controller may include a processor that controls platooning of a vehicle with one or more vehicles, each with a trailer. The platooning controller may further include a storage that stores information for controlling the platooning. The processor may control a host vehicle such that a hitch angle of the host vehicle with the trailer meets a predetermined reference angle, when it is necessary to perform braking control. The processor may control the host vehicle to perform the braking control.

In an embodiment, the processor may determine a current situation as a situation that needs the braking control, when the current situation is a critical driving situation while the host vehicle is traveling straight.

In an embodiment, the processor may transmit a control command signal to the vehicles, each with a trailer, to control the vehicles such that a hitch angle and a heading angle of each of the vehicles meet the predetermined reference angle, when it is necessary to perform the braking control.

In an embodiment, the processor may perform braking control of the host vehicle and may transmit a braking control command to following vehicles, when the host vehicle arrives at a braking control time and when receiving a signal indicating that the control of the hitch angle and the heading angle is completed from each of all the vehicles, each with the trailer.

In an embodiment, the processor may delay braking control during a predetermined interval, when the host vehicle arrives at a braking control time and when not receiving a signal indicating that the control of the hitch angle and the heading angle is completed from at least one of the vehicles, each with the trailer, and may perform the braking control.

In an embodiment, the processor may transmit a signal indicating whether the trailer is mounted to the host vehicle to a leading vehicle when starting to perform the platooning or during the platooning.

In an embodiment, the processor may determine whether each of the hitch angle and the heading angle of the host vehicle is greater than the predetermined reference angle, when receiving a command to control the hitch angle and the heading angle from the leading vehicle.

In an embodiment, the processor may control the host vehicle such that each of the hitch angle and the heading angle of the host vehicle is less than or equal to the predetermined reference angle, when each of the hitch angle and the heading angle of the host vehicle is greater than the predetermined reference angle. The processor may transmit a signal indicating that the control is completed to the leading vehicle.

In an embodiment, the processor may perform the braking control of the host vehicle, when receiving a braking control command from the leading vehicle. The processor may control the host vehicle to follow the leading vehicle after the braking control is completed.

In an embodiment, the platooning controller may further include a display that displays information received from another vehicle in a platooning line.

In an embodiment, the processor may check the hitch angle and the heading angle of the host vehicle while the braking control is performed and may maintain the control such that the hitch angle and the heading angle of the host vehicle are less than or equal to the predetermined reference angle.

According to another aspect of the present disclosure, a vehicle system may include a platooning controller that controls a host vehicle with a trailer such that a hitch angle of the host vehicle meets a predetermined reference angle, when it is necessary to perform braking control when controlling platooning with one or more vehicles, each with a trailer. The platooning controller controls the host vehicle to perform the braking control. The vehicle system further includes a sensing device that senses the hitch angle of the host vehicle.

In an embodiment, the sensing device may include a hitch angle sensor that senses the hitch angle of the host vehicle and a heading angle sensor that senses a heading angle of the host vehicle.

In an embodiment, the vehicle system may further include a communication device that performs vehicle-to-vehicle (V2V) communication between vehicles that are platooning.

According to another aspect of the present disclosure, a platooning control method may include: determining whether one or more vehicles are traveling straight, whether a trailer is mounted to each of the one or more vehicles, and whether there is a critical driving situation; transmitting a command to control a hitch angle and a heading angle to following vehicles included in the one or more vehicles as a result of the determination; determining whether a signal indicating that the control of the hitch angle and the heading angle is completed is received from each of the following vehicles, when the host vehicle arrives at a braking control time; and performing braking control depending on whether the signal is received.

In an embodiment, the transmitting of the command to control the hitch angle and the heading angle to the following vehicles may include transmitting the command to control the hitch angle and the heading angle to the following vehicles, as there are vehicles, each with the trailer, during the platooning, as the one or more vehicles are traveling straight, and as the one or more vehicles are under the critical driving situation, when it is necessary to brake.

In an embodiment, the performing of the braking control depending on whether the signal is received may include immediately performing the braking control, when the signal is received from each of all the vehicles, each with the trailer, performing braking delay, when some of the signals of the vehicles, each with the trailer, are not received, and performing the braking control at a time when an interval where the braking delay is performed is ended.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions may be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. The terms do not limit the nature, sequence or order of the constituent components. Unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An embodiment of the present disclosure discloses technologies to sense a hitch angle and a heading angle when an angle between a trailer and a tractor is twisted during platooning of platooning vehicles. Each platooning vehicle may include a trailer. The disclosure further discloses technologies to adjust the hitch angle and the heading angle and to perform braking control. As a result, the jackknife phenomenon is prevented.

Hereinafter, a description is given in detail of various embodiments of the present disclosure with reference to FIGS. 2-7.

A leading vehicle (LV) and a following vehicle (FV), each of which are included in a platooning group, may perform platooning on the road. The LV and the FV may travel while maintaining a specified distance. While the LV and the FV are traveling, the LV or the FV may adjust a distance between the LV and the FV. The LV or the FV may increase or decrease an inter-vehicle distance depending on manipulation of the driver.

Figure 2:
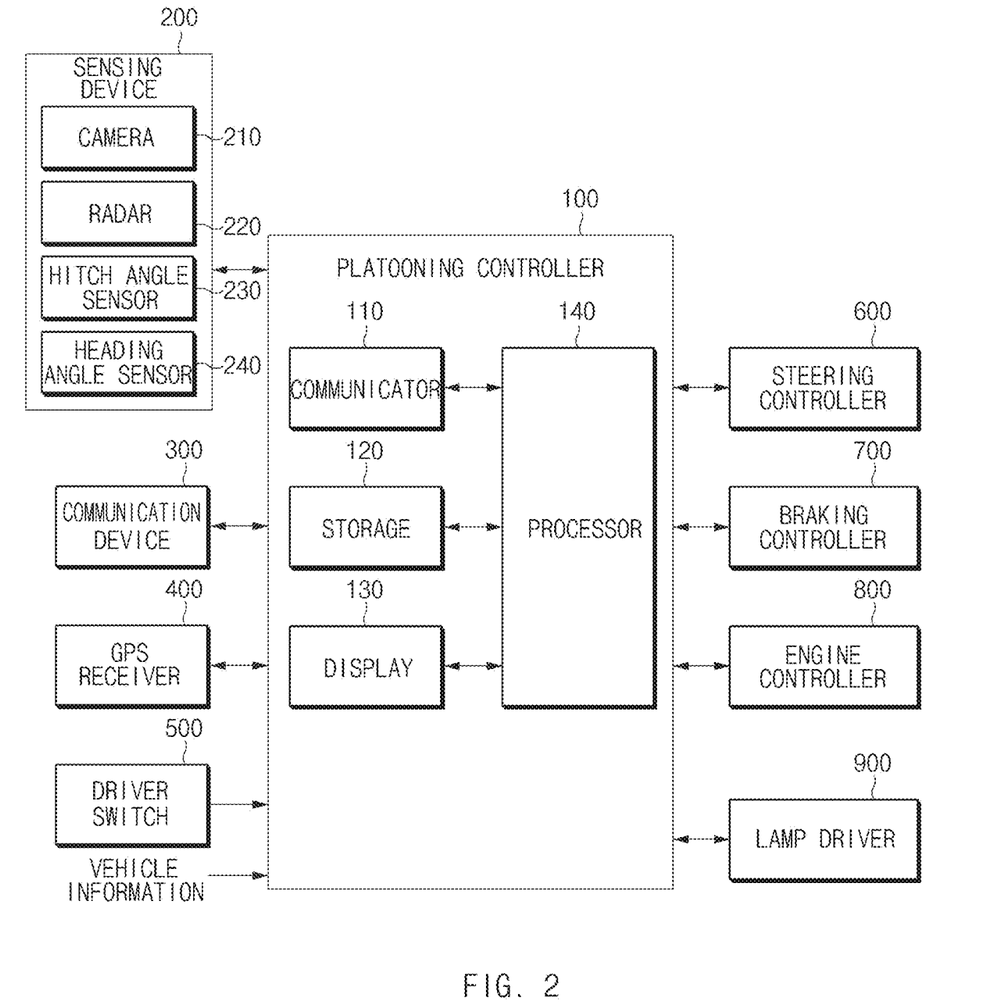
FIG. 2 is a block diagram illustrating a configuration of a vehicle system including a platooning controller according to an embodiment of the present disclosure.

FIG. 2 is a block diagram illustrating a configuration of a vehicle system that includes a platooning controller according to an embodiment of the present disclosure.

Referring to FIG. 2, the vehicle system according to an embodiment of the present disclosure may include a platooning controller 100, a sensing device 200, a communication device 300, a global positioning system (GPS)

receiver 400, a driver switch 500, a steering controller 600, a braking controller 700, an engine controller 800, and a lamp driver 900.

When it is necessary to perform braking control when controlling platooning that includes one or more vehicles, each with a trailer, the platooning controller 100 may control a host vehicle with the trailer such that a hitch angle of the host vehicle meets a predetermined reference angle and may control the host vehicle to perform braking control.

The platooning controller 100 may include a communicator 110, a storage 120, a display 130, and a processor 140.

The communicator 110 may be a hardware device implemented with various electronic circuits to transmit and receive a signal through a wireless or wired connection. In an embodiment of the present disclosure, the communicator 110 may perform inter-vehicle communication through controller area network (CAN) communication, local interconnect network (LIN) communication, Ethernet communication, or the like.

The storage 120 may store a sensing result of the sensing device 300 and vehicle-to-vehicle (V2V) communication information or the like received from vehicles in a platooning line. The storage 120 may include at least one type of storage medium, such as a flash memory type memory, a hard disk type memory, a micro type memory, a card type memory (e.g., a secure digital (SD) card or an extreme digital (XD) card), a random access memory (RAM) 1320, a static RAM (SRAM), a read-only memory (ROM) 1310, a programmable ROM (PROM), an electrically erasable PROM (EEPROM), a magnetic RAM (MRAM), a magnetic disk, and an optical disk.

The display 130 may be controlled by the processor 140 to display a platooning situation (e.g., a destination, a path, a braking control time, or the like) which is received from another vehicle which is platooning or is obtained by the processor 140. The display 130 may be implemented as a head-up display (HUD), a cluster, an audio video navigation (AVN), a human machine interface (HMI), or the like. Furthermore, the display 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, bended display, or a three-dimensional (3D) display. Some thereof may be implemented as transparent displays configured as a transparent type or a semi-transparent type to see the outside. Moreover, the display 130 may be implemented as a touchscreen including a touch panel to be used as an input device other than an output device.

The processor 140 may be electrically connected with the communicator 110, the storage 120, the display 130, or the like and may electrically control the respective components. The processor 140 may be an electric circuit which executes instructions of software and may perform a variety of data processing and calculation described below.

When it is determined that it is necessary to perform braking control, the processor 140 may control a host vehicle with a trailer such that a hitch angle of the host vehicle meets a predetermined reference angle before the braking control and may control the host vehicle to perform the braking control. In this case, the reference angle may be preset by an experimental value.

When the host vehicle is a leading vehicle and when the host vehicle is under a critical driving situation while the host vehicle is traveling straight, the processor 140 may determine the current situation as a situation which needs braking control.

When the host vehicle is the leading vehicle and when it is necessary to perform the braking control, the processor 140 may transmit a control command signal to the vehicles, each with the trailer, to control the vehicles such that a hitch angle and a heading angle of each of the vehicles, each with the trailer, meet a predetermined reference angle.

When the host vehicle is the leading vehicle and when the host vehicle arrives at a braking control time, and when receiving a signal indicating that the control of the hitch angle and the heading angle is complemented from each of all the vehicles, each with the trailer, the processor 140 may perform braking control of the host vehicle and may transmit a braking control command to the following vehicles.

When the host vehicle is the leading vehicle and when the host vehicle arrives at the braking control time, and when not receiving a signal indicating that the control of the hitch angle and the heading angle is completed from at least one of vehicles, each with the trailer, the processor 140 may delay braking control during a predetermined interval and may perform the braking control.

When the host vehicle is a following vehicle, the processor 140 may transmit a signal indicating whether a trailer is mounted to the host vehicle to a leading vehicle when the host vehicle starts to platoon or while the host vehicle is platooning.

When the host vehicle is the following vehicle and receiving a command to control a hitch angle and a heading angle from the leading vehicle, the processor 140 may determine whether each of a hitch angle and a heading angle of the host vehicle is greater than a predetermined reference angle.

When the host vehicle is the following vehicle and when each of the hitch angle and the heading angle of the host vehicle is greater than the predetermined reference angle, the processor 140 may control the host vehicle such that each of the hitch angle and the heading angle of the host vehicle is less than or equal to the predetermined reference angle and may transmit a signal indicating that the control is completed to the leading vehicle.

When the host vehicle is the following vehicle and receiving a braking control command from the leading vehicle, the processor 140 may perform braking control of the host vehicle and may control the host vehicle to follow the leading vehicle after the braking control is completed.

When the host vehicle is the following vehicle, the processor 140 may check a hitch angle and a heading angle of the host vehicle while the host vehicle performs braking control. The processor 140 may maintain the control such that each of the hitch angle and the heading angle of the host vehicle is less than or equal to the predetermined reference angle.

The sensing device 200 may include a camera 210 and a radar 220 for sensing a relative speed, a relative distance, a movement direction, and the like of a forward vehicle. The sensing device 200 may further include an ultrasonic sensor, a laser scanner and/or a corner radar, a light detection and ranging (LiDAR), an acceleration sensor, a yaw rate sensor, a torque sensor and/or a wheel speed sensor, a steering angle sensor, or the like, other than the radar 220 and the camera 210. Furthermore, the sensing device 200 may include a hitch angle sensor 230 for sensing a hitch angle of the host vehicle and a heading angle sensor 240 for sensing a heading angle of the host vehicle. In this case, the hitch angle may refer to an angle at which a line extending the centerline of a tractor and a line extending the centerline of a trailer meet. The heading angle may refer to an angle defined by the lane and the tracker.

The communication device 300 may perform V2V communication between vehicles which are platooning and may include a hardware device implemented with various electronic circuits, for example, a mobile communication unit, a broadcast receiving unit, such as a digital multimedia broadcasting (DMB) module or a digital video broadcasting-handheld (DVB-H) module, a short-range communication unit, such as a ZigBee module or a near field communication (NFC) module which is a Bluetooth module, and a wireless-fidelity (Wi-Fi) unit.

The GPS receiver 400 may receive GPS information from a GPS satellite and may transmit the received GPS information to the platooning controller 100 to determine detailed location information of the host vehicle.

The driver switch 500 may receive a platooning request, a platooning acceptance, or the like from a driver of the host vehicle.

Vehicle information may include vehicle driving information received from a device in the host vehicle, information associated with a cargo box, separately input from a user, and the like.

The steering controller 600 may be configured to control a steering angle of the host vehicle. The steering controller 600 may include a steering wheel, an actuator interlocked with the steering wheel, and a controller for controlling the actuator.

The braking controller 700 may be configured to control to brake the host vehicle and may include a controller for controlling a brake.

The engine controller 800 may be configured to control to drive an engine of the host vehicle and may include a controller for controlling a speed of the host vehicle.

The lamp driver 900 may drive a lamp, i.e., a lighting device, which displays a signal of a turn signal, a stop signal, a platooning mode signal, or the like.

Figure 3:
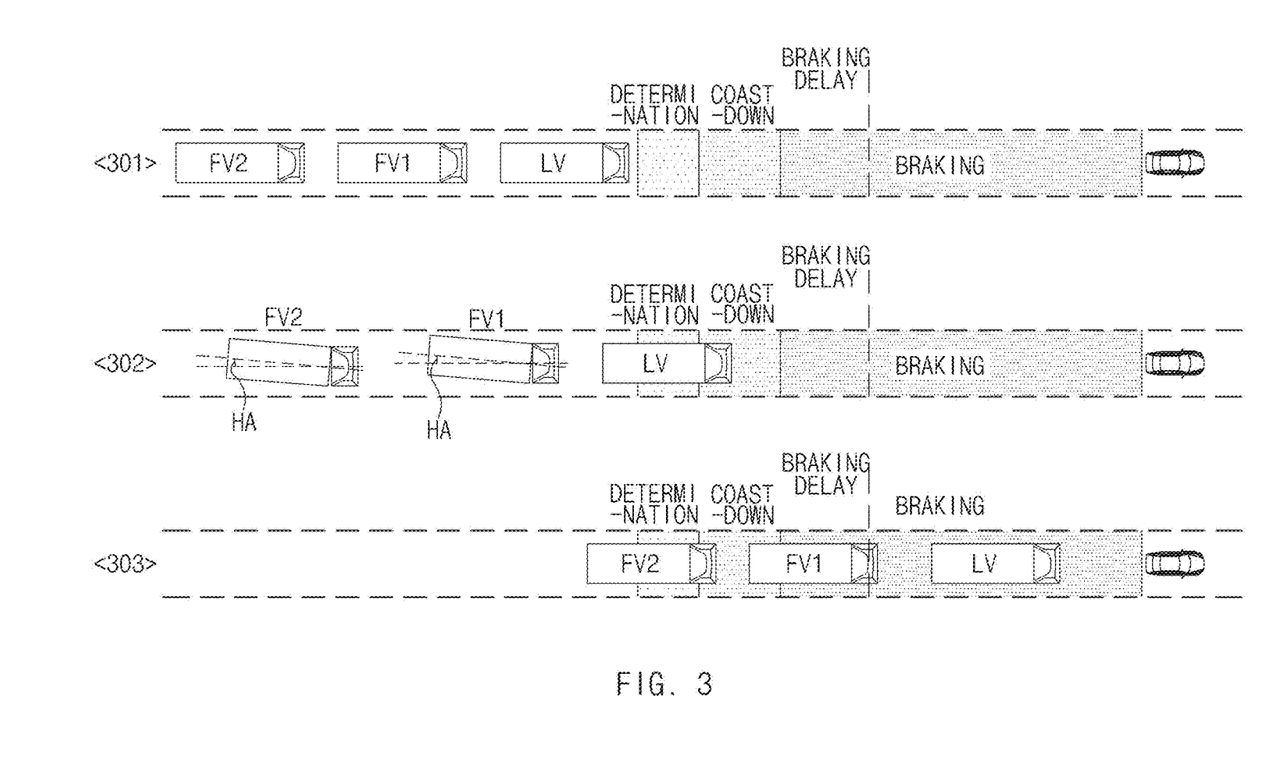
FIG. 3 is a drawing illustrating a braking control time during platooning according to an embodiment of the present disclosure.

FIG. 3 is a drawing illustrating a braking control time during platooning according to an embodiment of the present disclosure.

Referring to FIG. 3, a platooning vehicle may perform braking control in an order of: a determination section for determining where it is necessary to brake; a coastdown section where the platooning vehicle is traveling in a state where a driver of the platooning vehicle does not step on the accelerator; a braking delay section where a braking time is delayed by increasing an amount of braking as much as possible before braking; and a braking section.

Referring to reference numeral 301, a leading vehicle LV, which is platooning, may determine whether a current time is a time that requires braking, i.e., a critical situation.

In this case, when it is determined that the current time is the time that requires braking, the leading vehicle LV may enter the coastdown section where a driver of the leading vehicle LV takes his or her foot off the accelerator to brake and drives the leading vehicle LV. Each of the vehicles, which are platooning, may detect its hitch angle and its heading angle and may determine whether each of the hitch angel and the heading angle is greater than a predetermined reference value.

In an embodiment according to reference numeral 302, a hitch angle HA of each of the following vehicles FV1 and FV2 is greater than the predetermined reference value.

Thus, in an embodiment according to reference numeral 303, the following vehicles FV1 and FV2 are arranged, i.e., controlled such that their hitch angels are 0 and perform braking control in the arranged state in the braking section.

Figure 4:
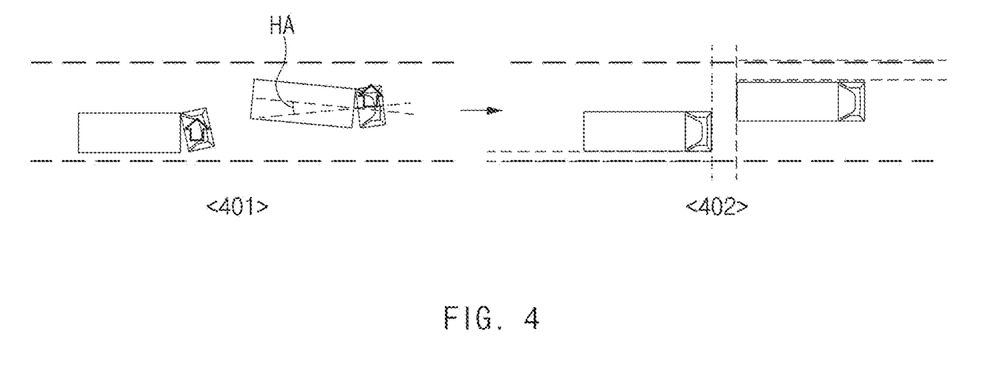
FIG. 4 is a drawing illustrating performing hitch angle and heading angle control during platooning according to an embodiment of the present disclosure.

FIG. 4 is a drawing illustrating performing hitch angle and heading angle control during platooning according to an embodiment of the present disclosure.

In an embodiment according to reference numeral 401 of FIG. 4, each of a hitch angle HA and a heading angle of each of the platooning vehicles is greater than a predetermined reference value and the vehicles are misaligned. In this case, the hitch angle HA may be an angle at which a line extending the centerline of a tractor and a line extending the centerline of a trailer meet. The hitch angle HA may be 0 when the trailer and the tractor are in the same direction.

In an embodiment according to reference numeral 402, each of the platooning vehicles adjusts its hitch angle and its heading angle and the vehicles are arranged. In other words, a platooning controller 100 of FIG. 2 may perform steering control and differential braking such that a heading angle and a hitch angle become 0 in the lane.

Furthermore, while a following vehicle controls such that a hitch angle of a trailer becomes 0 during a braking operation, it may autonomously proceed with heading angle control in the lane to perform more stable lane keeping than existing steering following control of a leading vehicle.

Figure 5:
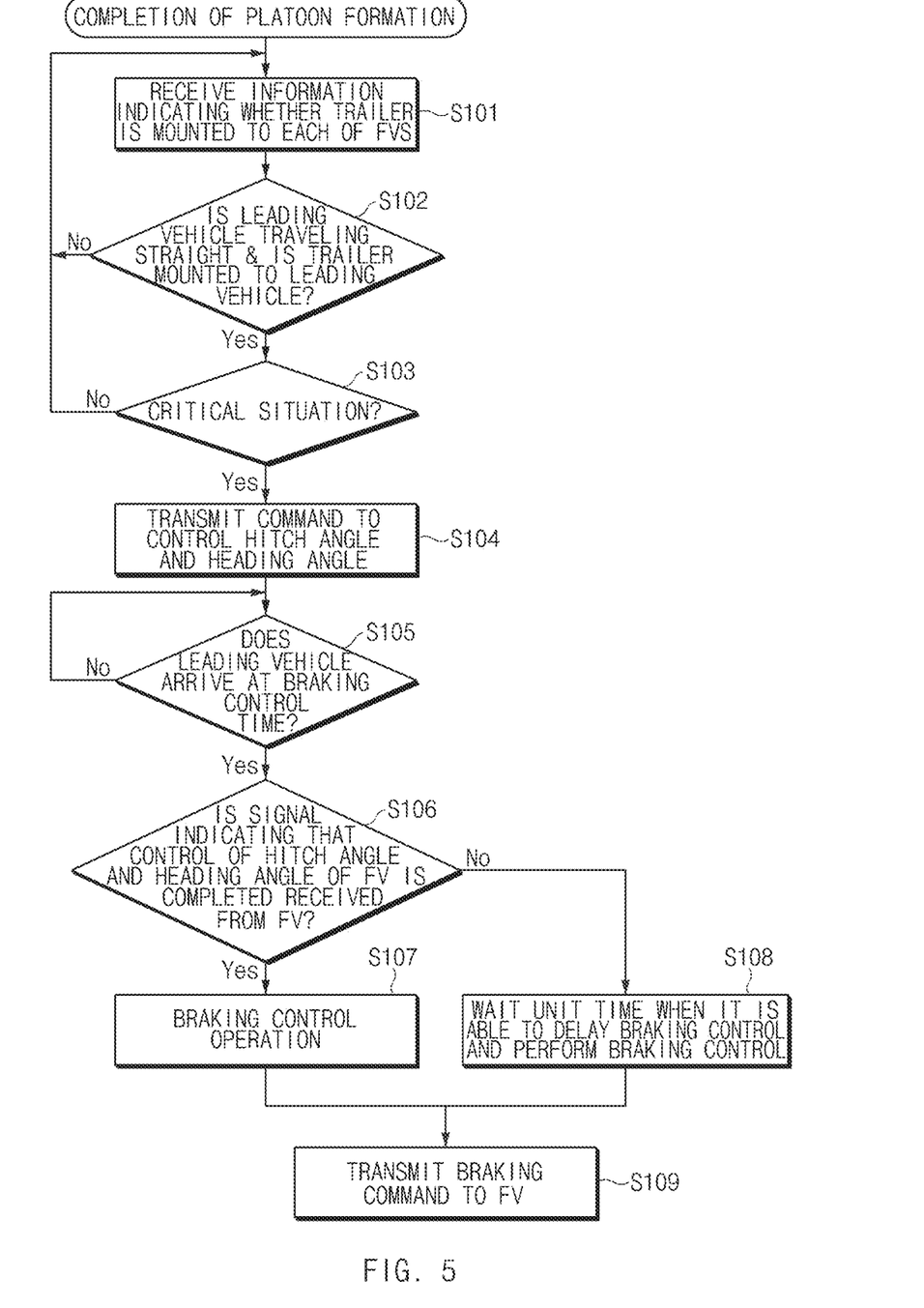
FIG. 5 is a flowchart illustrating a braking control method during platooning of a leading vehicle according to an embodiment of the present disclosure.

Hereinafter, a description is given in detail of a braking control method during platooning of a leading vehicle according to an embodiment of the present disclosure with reference to FIG. 5. FIG. 5 is a flowchart illustrating a braking control method during platooning of a leading vehicle according to an embodiment of the present disclosure.

Hereinafter, it is assumed that a platooning controller 100 of FIG. 2 performs a process of FIG. 5. Furthermore, in the description of FIG. 5, an operation described as being performed by an apparatus may be understood as being controlled by a processor 140 of the platooning controller 100. In this case, the platooning controller 100 may be loaded into a leading vehicle LV.

Referring to FIG. 5, in S101, the apparatus of the leading vehicle LV may receive information indicating whether a trailer is mounted to each of following vehicles from each of the following vehicles. In this case, the leading vehicle LV may receive information indicating whether the trailer is mounted to each of the following vehicles at a time when starting to platoon or during platooning from each of the following vehicles.

In S102, the apparatus of the leading vehicle LV may determine whether the leading vehicle LV is traveling straight and whether a trailer is mounted to the leading vehicle LV. In S103, the apparatus of the leading vehicle LV may determine whether a current situation is a critical situation which needs braking. In this case, the apparatus of the leading vehicle LV may determine whether the leading vehicle LV is traveling straight using a heading angle, a driving path, or the like of the leading vehicle LV.

Furthermore, the apparatus of the leading vehicle LV may determine whether there is a vehicle to which the trailer is mounted using the information received from each of the following vehicles. Furthermore, when an inter-vehicle distance is narrower than a set inter-vehicle distance or when there is an obstacle, such as a cut-in vehicle, in front of the leading vehicle LV, the apparatus of the leading vehicle LV may determine a critical situation to determine that it is necessary to brake platooning vehicles.

When the leading vehicle LV is traveling straight, when there is a vehicle to which a trailer is mounted among platooning vehicles, and when the current situation is a critical situation which needs braking, in S104, the apparatus of the leading vehicle LV may transmit a command to control a hitch angle and a heading angle to the following vehicle to which the trailer is mounted. In this case, when there is no following vehicle to which a trailer is mounted and when a trailer is mounted to only the leading vehicle LV, the apparatus of the leading vehicle LV may control the leading vehicle LV such that each of a hitch angle and a heading angle of the leading vehicle LV is 0, without transmitting the command to control the hitch angle and the heading angle to the following vehicle. In this case, the leading vehicle LV may perform steering control and differential braking such that the heading angle and the hitch angle become 0 in the lane.

In S105, the apparatus of the leading vehicle LV may determine whether the leading vehicle LV arrives at a braking control time. In this case, the braking control time may include a time when a host vehicle starts to perform braking control and starts to perform braking control to avoid colliding with a forward vehicle and may be calculated using a general method for calculating a braking control time.

When the leading vehicle LV arrives at the braking control time, in S106, the apparatus of the leading vehicle LV may check whether a signal indicating that the control of the hitch angle is completed from the following vehicle to which the trailer is mounted. When receiving a signal indicating that the control of the hitch angle and the heading angle is completed from each of all the following vehicles, each with the trailer, in S107, the apparatus of the leading vehicle LV may start to perform a braking control operation.

On the other hand, when any one of the following vehicles, each with the trailer, does not transmit a signal indicating that the control of the hitch angle and the heading angle is completed, in S108, the apparatus of the leading vehicle LV may perform braking control after waiting until a time when it is able to delay braking control. After the apparatus of the leading vehicle LV performs braking control of the leading vehicle LV in S107 and S108, in S109, it may transmit a braking command to the following vehicles.

When it is expected for the leading vehicle LV to collide with a vehicle CV, which cuts in front of the leading vehicle LV, the leading vehicle LV may determine that it is necessary to brake and may calculate a braking time. In this case, the leading vehicle LV may calculate a time when braking starts, based on a distance obtained by including a margin distance in the distance where the leading vehicle LV does not collide with the cut-in vehicle CV after the braking starts. In other words, the braking time may be calculated by including the margin distance in the distance where the leading vehicle LV should start to brake and does not collide with the cut-in vehicle CV. The braking delay may be determined using such a margin distance. For example, when it is determined that a leading vehicle should start to brake 200 meters ahead so that the leading vehicle does not collide with a cut-in vehicle which is located 300 meters ahead, the braking time may be a point which is located 150 meters ahead. The point is obtained by adding a first point, which is located 200 meters ahead, to a margin distance (−50 meters). In this case, when the leading vehicle LV does not receive a signal indicating that the control of the hitch angle and the heading angle is completed from each of following vehicles, it may set a section to 200 meters ahead as a braking delay section. After, the leading vehicle LV may wait to receive a signal indicating that the control of the hitch angle and the heading angle is completed from each of the following vehicles until the leading vehicle LV arrives at a section which is located 200 meters ahead. Although the leading vehicle LV may not receive the signal indicating that the control of the hitch angle and the heading angle is completed from each of the following vehicles at a point which is located 200 meters ahead, the leading vehicle LV may perform braking control and may transmit a braking control command to the following vehicles.

Figure 6:
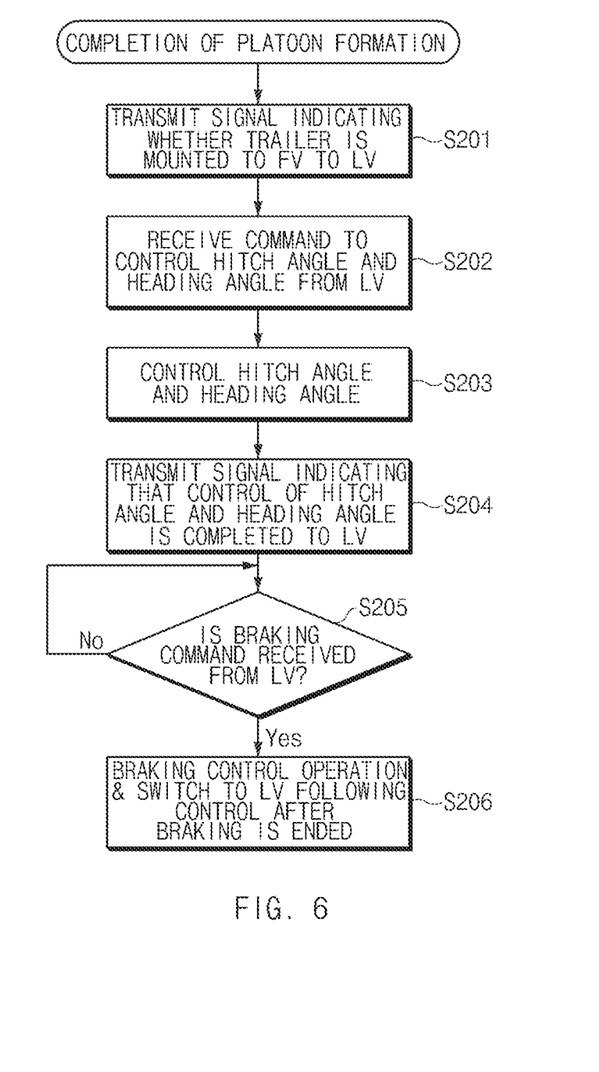
FIG. 6 is a flowchart illustrating a braking control method during platooning of a following vehicle according to an embodiment of the present disclosure.

Hereinafter, a description is given in detail of a braking control method during platooning of a following vehicle according to an embodiment of the present disclosure with reference to FIG. 6. FIG. 6 is a flowchart illustrating a braking control method during platooning of a following vehicle according to an embodiment of the present disclosure.

Hereinafter, it is assumed that a platooning controller 100 of FIG. 2 performs a process of FIG. 6. Furthermore, in the description of FIG. 6, an operation described as being performed by an apparatus may be understood as being controlled by a processor 140 of the platooning controller 100. In this case, the platooning controller 100 may be loaded into a following vehicle FV.

In S201, the apparatus of the following vehicle FV may transmit a signal indicating whether a trailer is mounted to the following vehicle FV to a leading vehicle LV. When receiving a command to control a hitch angle and a heading angle from the leading vehicle LV in S202, in S203, the apparatus of the following vehicle FV may control such that a hitch angle and a heading angle of the following vehicle FV become 0. The apparatus of the following vehicle FV may perform steering control and differential braking such that the heading angle and the hitch angle become 0 in the lane. As the heading angle and the hitch angle of the following vehicle FV become 0, when the control is completed, in S204, the apparatus of the following vehicle FV may transmit a signal indicating that the control of the hitch angle and the heading angle is completed to the leading vehicle LV. When receiving a braking command from the leading vehicle LV in S205, in S206, the apparatus of the following vehicle FV may perform braking control. In S206, the apparatus of the following vehicle FV may switch to the leading vehicle following control after the braking is ended and may perform following control.

As such, an embodiment of the present disclosure: may cause each of the vehicles which are platooning to control its hitch angle and its heading angle in advance before braking control to minimize the jackknife phenomenon; may delay a braking time until the control of the hitch angle and the heading angle is completed to increase stability; may continue detecting a hitch angel and a heading angle during braking control; and may control the vehicles such that the platooning vehicles are arranged when they are misaligned to minimize a behavior influence of a leading vehicle. Furthermore, an embodiment of the present disclosure may perform braking control of a following vehicle and automatically switch to perform leading vehicle following control.

Thus, an embodiment of the present disclosure may control a hitch angle and a heading angle of each of the platooning vehicles in advance before braking control to arrange the vehicles and may perform the braking control to minimize the jackknife phenomenon. Thus, deterioration in driving performance and in fuel efficiency is prevented.

Figure 7:
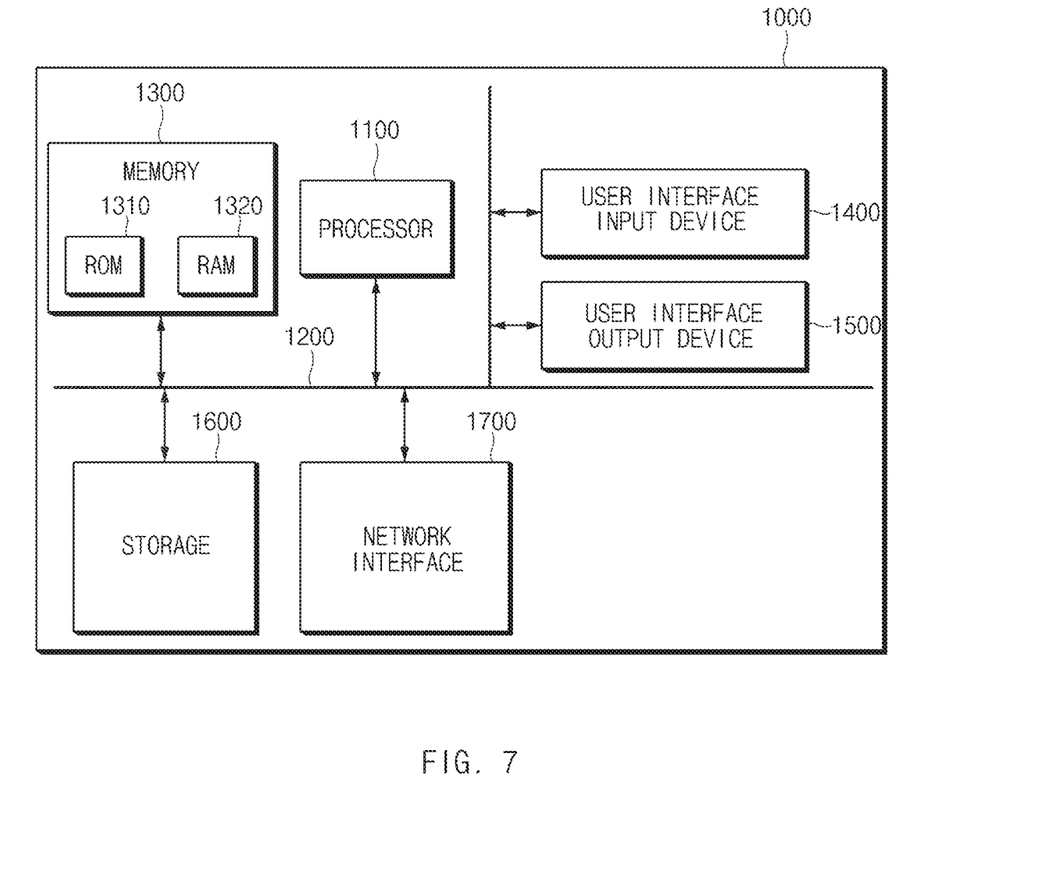
FIG. 7 is a block diagram illustrating a computing system according to an embodiment of the present disclosure.

FIG. 7 is a block diagram illustrating a computing system according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory 1320, a flash memory, a ROM memory 1310, an EPROM memory, an EEPROM memory, a register, a hard disk, a removable disk, and a CD-ROM.

The storage medium or computer-readable medium in which a program containing computer-executable instructions is stored may be coupled to the processor 1100. The processor 1100 may execute the program. The processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may reduce a hitch angle of a trailer using steering angle control and differential braking before braking during platooning, thus preventing the jack-knife phenomenon.

In addition, various effects directly or indirectly ascertained through the present disclosure may be provided.

Hereinabove, although the present disclosure has been described with reference to various embodiments and the accompanying drawings, the present disclosure is not limited thereto. The disclosed embodiments may be variously modified and altered by those of ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:

1. A platooning controller, comprising:
 a processor configured to control platooning of one or more vehicles, each with a trailer; and
 a storage that stores information for controlling the platooning,
 wherein the processor is configured to:
  control a host vehicle such that a hitch angle of the host vehicle with a corresponding trailer meets a predetermined reference angle, when it is necessary to perform braking control, and control the host vehicle to perform the braking control;
  in a first situation,
   transmit a command signal from a leading vehicle to a following vehicle for controlling the hitch angle of the following vehicle to meet a predetermined reference angle, when braking control is required, and
   transmit a brake control command signal to the following vehicle; and
  in a second situation,
   adjust the hitch angle of the following vehicle through a heading angle adjustment or partial braking of the following vehicle when the command signal for the hitch angle is received from the leading vehicle, wherein another signal notifies the leading vehicle of completion of the controlling of the hitch angle,
   perform a braking of the following vehicle when a braking command signal is received from the leading vehicle, and
   control the following vehicle to follow the leading vehicle when the braking control is completed,
  wherein the host vehicle is the leading vehicle in the first situation and is the following vehicle in the second situation.

2. The platooning controller of claim 1, wherein the processor determines a current situation as a situation which needs the braking control, when the current situation is a critical driving situation while the host vehicle is traveling straight.

3. The platooning controller of claim 1, wherein the processor transmits a control command signal to the one or more vehicles to control the one or more vehicles such that a hitch angle and a heading angle of each of the vehicles meet the predetermined reference angle, when it is necessary to perform the braking control.

4. The platooning controller of claim 3, wherein the processor performs braking control of the host vehicle and transmits a braking control command to following vehicles, when the host vehicle arrives at a braking control time and when receiving a signal indicating that the control of the hitch angle and the heading angle is completed from each of the host and following vehicles.

5. The platooning controller of claim 3, wherein the processor delays braking control during a predetermined interval, when the host vehicle arrives at a braking control time and when not receiving a signal indicating that the control of the hitch angle and the heading angle is completed from at least one of the one or more vehicles and performs the braking control.

6. The platooning controller of claim 1, wherein the processor transmits a signal indicating whether a trailer is mounted to the host vehicle to a leading vehicle when starting to perform the platooning or during the platooning.

7. The platooning controller of claim 6, wherein the processor determines whether each of the hitch angle and the heading angle of the host vehicle is greater than the predetermined reference angle, when receiving a command to control the hitch angle and the heading angle from the leading vehicle.

8. The platooning controller of claim 7, wherein the processor controls the host vehicle such that each of the hitch angle and the heading angle of the host vehicle is less than or equal to the predetermined reference angle, when each of the hitch angle and the heading angle of the host vehicle is greater than the predetermined reference angle, and transmits a signal indicating that the control is completed to the leading vehicle.

9. The platooning controller of claim 8, wherein the processor performs the braking control of the host vehicle, when receiving a braking control command from the leading vehicle, and controls the host vehicle to follow the leading vehicle after the braking control is completed.

10. The platooning controller of claim 1, further comprising:
a display configured to display information received from another vehicle in a platooning line.

11. The platooning controller of claim 8, wherein the processor checks the hitch angle and the heading angle of the host vehicle while the braking control is performed and maintains the control such that the hitch angle and the heading angle of the host vehicle are less than or equal to the predetermined reference angle.

12. A vehicle system, comprising:
a platooning controller configured to control a host vehicle, with a trailer, such that a hitch angle of the host vehicle meets a predetermined reference angle, when it is necessary to perform braking control when controlling platooning with one or more vehicles, each with a trailer, and control the host vehicle to perform the braking control; and
a sensing device configured to sense the hitch angle of the host vehicle,
wherein the platooning controller is configured to:
in a first situation,
transmit a command signal from a leading vehicle to a following vehicle for controlling the hitch angle of the following vehicle to meet a predetermined reference angle, when braking control is required, and
transmit a brake control command signal to the following vehicle; and
in a second situation,
adjust the hitch angle of the following vehicle through a heading angle adjustment or partial braking of the following vehicle when the command signal for the hitch angle is received from the leading vehicle, wherein another signal notifies the leading vehicle of completion of the controlling of the hitch angle,
perform a braking of the following vehicle when a braking command signal is received from the leading vehicle, and
control the following vehicle to follow the leading vehicle when the braking control is completed,
wherein the host vehicle is the leading vehicle in the first situation and is the following vehicle in the second situation.

13. The vehicle system of claim 12, wherein the sensing device includes:
a hitch angle sensor configured to sense the hitch angle of the host vehicle; and
a heading angle sensor configured to sense a heading angle of the host vehicle.

14. The vehicle system of claim 13, further comprising:
a communication device configured to perform vehicle-to-vehicle (V2V) communication between vehicles, which are platooning.

15. A method for controlling platooning including one or more vehicles, each with a trailer, the method comprising:
determining whether the one or more vehicles are traveling straight, whether a trailer is mounted to each of the one or more vehicles, and whether there is a critical driving situation;
transmitting a command to control a hitch angle and a heading angle to following vehicles included in the one or more vehicles as a result of the determination;
determining whether a signal indicating that the control of the hitch angle and the heading angle is completed is received from each of the following vehicles, when a host vehicle arrives at a braking control time; and
performing braking control depending on whether the signal is received,
wherein the method further includes:
in a first situation,
transmitting a command signal from a leading vehicle to a following vehicle for controlling the hitch angle of the following vehicle to meet a predetermined reference angle, when braking control is required, and
transmitting a brake control command signal to the following vehicle; and
in a second situation,
adjusting the hitch angle of the following vehicle through a heading angle adjustment or partial braking of the following vehicle when the command signal for the hitch angle is received from the leading vehicle, wherein another signal notifies the leading vehicle of completion of the controlling of the hitch angle,
performing a braking of the following vehicle when a braking command signal is received from the leading vehicle, and
controlling the following vehicle to follow the leading vehicle when the braking control is completed,
wherein the host vehicle is the leading vehicle in the first situation and is the following vehicle in the second situation.

16. The method of claim 15, wherein the transmitting of the command to control the hitch angle and the heading angle to the following vehicles includes:
transmitting the command to control the hitch angle and the heading angle to the following vehicles during the platooning, as the one or more vehicles are traveling straight, and as the one or more vehicles are under the critical driving situation, when it is necessary to brake.

17. The method of claim 15, wherein the performing of the braking control, depending on whether the signal is received, includes:
immediately performing the braking control, when the signal is received from each of the one or more vehicles;
performing braking delay, when some of the signals of the one or more vehicles are not received; and
performing the braking control at a time when an interval where the braking delay is performed is ended.

* * * * *